(12) United States Patent
Schmitt et al.

(10) Patent No.: US 7,843,574 B2
(45) Date of Patent: Nov. 30, 2010

(54) APPARATUS AND METHOD FOR MEASURING THE SURFACE OF A BODY

(75) Inventors: Peter Schmitt, Erlangen (DE); Gunther Kostka, Erlangen (DE); Oliver Scholz, Mohrendorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 227 days.

(21) Appl. No.: 12/096,408

(22) PCT Filed: Dec. 8, 2006

(86) PCT No.: PCT/EP2006/011848

§ 371 (c)(1),
(2), (4) Date: Jul. 18, 2008

(87) PCT Pub. No.: WO2007/065704

PCT Pub. Date: Jun. 14, 2007

(65) Prior Publication Data

US 2008/0273211 A1 Nov. 6, 2008

(30) Foreign Application Priority Data

Dec. 9, 2005 (DE) .................. 10 2005 058 873

(51) Int. Cl.
*G01B 11/24* (2006.01)
(52) U.S. Cl. ..................................... 356/611
(58) Field of Classification Search ............ 356/601, 356/603, 606, 607, 611

See application file for complete search history.

(56) References Cited

U.S. PATENT DOCUMENTS

| 4,498,778 | A | * | 2/1985 | White | 356/606 |
|---|---|---|---|---|---|
| 4,846,576 | A | * | 7/1989 | Maruyama et al. | 356/604 |
| 5,135,308 | A | | 8/1992 | Kuchel | |
| 6,028,672 | A | | 2/2000 | Geng | |
| 6,064,759 | A | * | 5/2000 | Buckley et al. | 382/154 |
| 6,205,243 | B1 | * | 3/2001 | Migdal et al. | 382/154 |
| 6,297,881 | B1 | * | 10/2001 | Yahashi et al. | 356/625 |
| 6,480,287 | B2 | | 11/2002 | Lee et al. | |

(Continued)

FOREIGN PATENT DOCUMENTS

DE  25 54 086 A  6/1977

(Continued)

OTHER PUBLICATIONS

English translation of DE 25 54 086, published on Jun. 16, 1977.

(Continued)

*Primary Examiner*—Roy Punnoose
(74) *Attorney, Agent, or Firm*—Keating & Bennett, LLP (57) ABSTRACT

In a light-slit method, a first and a second measurement light projection on a surface of an object to be measured may be unambiguously identified as a first or a second measurement light projection by a camera when there is a support apparatus operating the camera and/or the measurement light projectors such that, in each light-slit recording of the camera, either the first or the second measurement light projection is visible to the camera. The possibility of unambiguous identification allows evaluating several spatially overlapping and not exactly aligned measurement light projections by means of a camera.

15 Claims, 5 Drawing Sheets

U.S. PATENT DOCUMENTS

| | | | |
|---|---|---|---|
| 6,496,254 B2 | 12/2002 | Bostrom et al. | |
| 6,529,627 B1 * | 3/2003 | Callari et al. | 382/154 |
| 7,324,217 B2 * | 1/2008 | Herrmann et al. | 356/606 |
| 7,375,826 B1 * | 5/2008 | Lavelle et al. | 356/607 |
| 7,672,485 B2 * | 3/2010 | Chambard et al. | 382/108 |
| 2004/0247170 A1 * | 12/2004 | Furze et al. | 382/141 |

FOREIGN PATENT DOCUMENTS

| | | |
|---|---|---|
| EP | 1 030 173 A1 | 8/2000 |
| WO | 91/08439 A1 | 6/1991 |
| WO | 92/01205 A1 | 1/1992 |

OTHER PUBLICATIONS

Official Communication issued in International Patent Application No. PCT/EP2006/011848, mailed on Feb. 28, 2007.

* cited by examiner

APPARATUS AND METHOD FOR MEASURING THE SURFACE OF A BODY

TECHNICAL FIELD

The present invention concerns the contactless measurement of 3-dimensional bodies, in particular by means of optical light-slit methods.

BACKGROUND

There are many applications where the surface and/or the shape of a body is to be measured in a contactless manner. In the production of airplane airfoils, for example, with some types of airplane, the shape of the airfoil is measured after individual production steps so as to ascertain possible deviations of the actual shape from a nominal shape. Another alternative application is the contactless measurement of the surface of castings or moldings, for example, so as to be able to discard defectively produced parts.

Frequently, bodies resulted to for the contactless measurement, is the optical measurement of 3-dimensional bodies, wherein particularly frequent use is made of the light-slit method.

Figure 5:
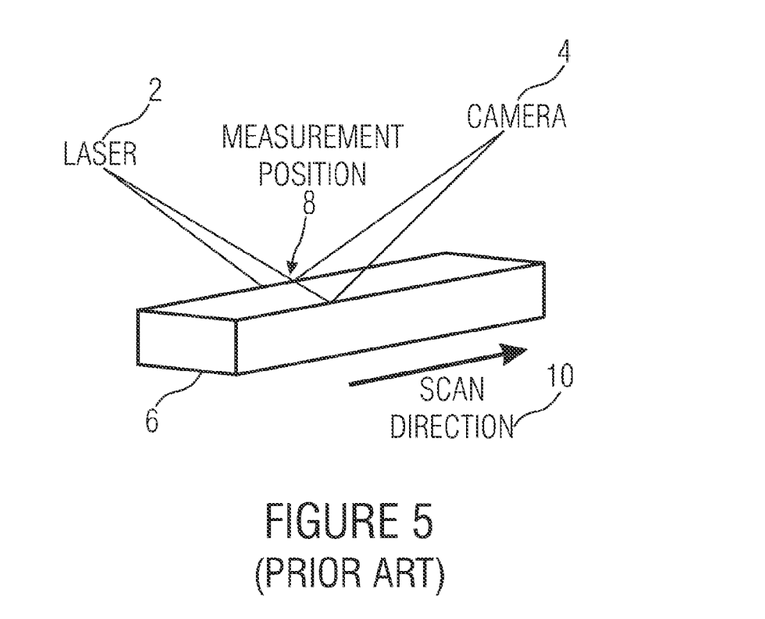
FIG. 5 shows a fundamental mode of operation of the light-slit measurement method.

In the light-slit method as it is schematically illustrated in FIG. 5, a light line is projected onto an object to be tested. The course of the light line on the surface of the object is recorded at an angle to the projection direction by means of a camera. This course therefore reflects the topography of the surface and may therefore be used for the 3-dimensional measurement of the surface when the object to be measured is moved under the assembly of laser and camera.

FIG. 5 shows a laser 2 as the light projector, a camera 4 and an exemplary simple geometrical object, that is a cuboid 6, as the object to be measured. By means of suitable laser optics, the laser 2 generates a fanned-out beam, which is projected onto the surface of the cuboid 6 at the measurement position 8. The camera 4 observes the light line at the measurement position 8. As the projection direction of the laser 2 and the observation direction of the camera 4 form an angle, the measurement beam, when there is a change in the surface of the cuboid 6, e.g. an elevation on the surface, is detected by the camera 4 in another location on the light sensor of the camera 4 (e.g., a CCD). From knowledge of the angle between laser 2 and camera 4 as well as knowledge of the detection position of the light beam in the camera sensor, the topographical information on the surface of the cuboid 6 may be obtained at the measurement position 8. If the cuboid is passed under the measurement position 8 in a scan direction 10, a 3-dimensional surface profile of the cuboid to be measured may be created.

In the example shown in FIG. 5, it is in principle only possible to measure one single surface of the cuboid 6, that is the one on which the light projection of the laser 2 is visible at the measurement position 8. In the general case of the 3-dimensional measurement of bodies, there is the problem that only a portion of the entire surface is detected by the light line and the camera, with the rest of the surface not being illuminated. If the entire surface of a body is to be measured, several light lines and one or more cameras therefore have to be used.

Figure 6:
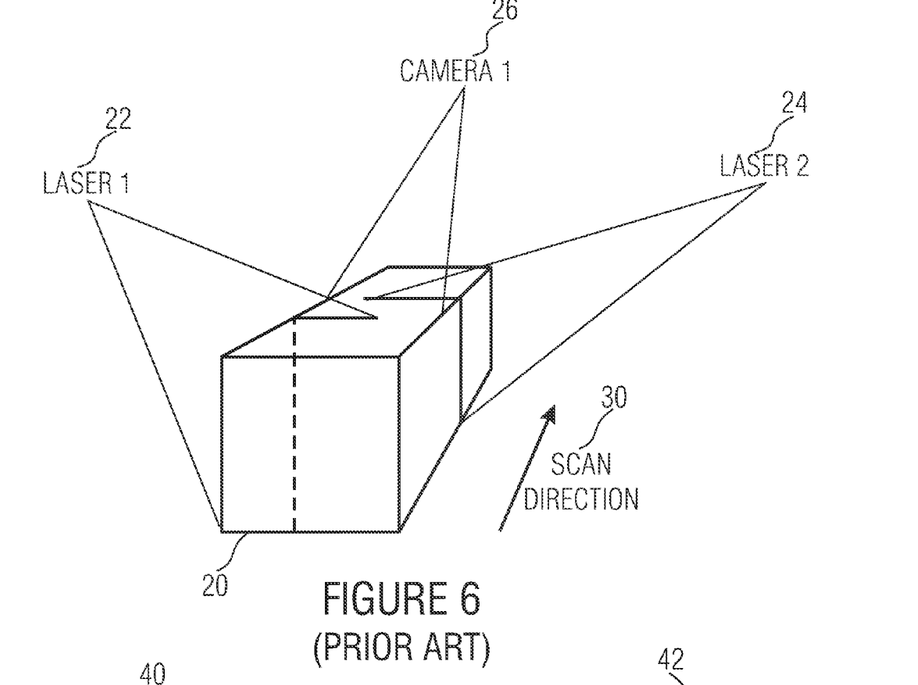
FIG. 6 shows a measurement of a surface by means of several light slits.

FIG. 6 illustrates this by means of a 3-dimensional measurement of a cuboid 20, which is illuminated by a first laser 22 and a second laser 24, wherein, for the sake of clarity, only one camera 26 is shown in FIG. 6. As can be seen in FIG. 6, the laser 1 illuminates the left-hand side and a portion of the surface of the cuboid 20, whereas the second laser 24 illuminates the right-hand side and a portion of the surface of the cuboid.

It is to be noted that for complete measurement of the cuboid 20, several cameras are necessitated; however, the additionally necessitated cameras are not shown as they are not indispensable for understanding the method. For completely measuring the surface of the cuboid 20 by means of camera 1, those proportions of the light lines of the laser 22 and the laser 24 projecting a line onto the surface of the cuboid 20 are to exhibit spatial overlap so as to be able to completely detect the surface. If the lines do not exhibit any overlap, the initial and end points of the different light lines would have to exactly lie on top of each other. However, as the lines are generated by means of a spot laser using special line optics, the length of the light line generated on the object depends on the distance of the laser to the object. In 3-dimensional bodies, the distance of the surface from the various lasers, however, changes from measurement location to measurement location (that is along the scan direction 30). It is therefore not possible to align the initial and end points of the lasers 22 and 24.

Special light-slit sensors in the camera 26 determine the position of a light line as early as on the sensor itself, as this serves to achieve a maximum measurement rate, which amounts to up to 20,000 evaluated light lines per second in currently available sensors.

When using several light lines from different lasers, as it is illustrated in FIG. 6 on the surface of the cuboid 20, however, such sensors are, however, not capable of deciding which of the light lines is to be drawn upon for correct measurement. For bypassing this problem and the associated misinterpretations, the projected light lines would have to seamlessly blend from one to the next. In principle, this may be achieved by having the light lines first aligned in parallel and then having them shifted in parallel until they exactly lie on top of each other. Although this is basically possible, this process involves tremendous adjustment efforts. One additional problem is that this adjustment is not time-stable due to external influences such as the temperature changing or mechanical stresses occurring.

One further problem of the light-slit method is posed by the fact that elevated portions on the surface of the object may cause shadows when using a camera and a laser, which means that portions of the surface may not be detected.

Figure 7:
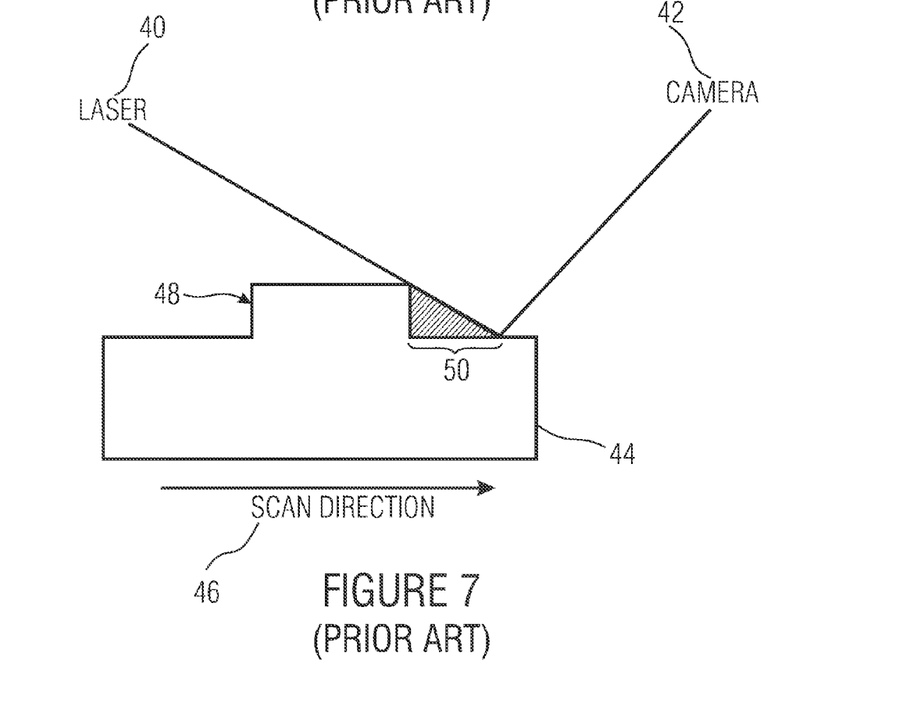
FIG. 7 shows shading effects in the light-slit method.

This is illustrated by means of FIG. 7, in which a laser 40, a camera 42 and an object 44 to be measured are schematically shown. The feed direction 46 (scan direction) is symbolized by means of an arrow.

The object 44 to be measured exhibits an elevation 48 so that, when the assembly is used, the given geometry and the rectilinear propagation of light prevent measuring a region 50. In the region 50, projecting a measurement light beam is impossible as same is shaded by the elevation 48.

In principle, this problem may be solved by using two cameras arranged symmetrically relative to the projection direction of the light line, for example. When the laser illuminates the object in a perpendicular manner from above, for example, the cameras will record the position of the light line from two different directions. Obviously, this serves to avoid shading effects as the light beam itself cannot be shaded and at least one camera can observe the light beam in each case. What is very disadvantageous with this approach, however, is the greatly increased cost expenditure caused by the use of a second, complex camera. As the positions of laser and camera are basically interchangeable, it is also possible to combine one camera and two lasers so as to avoid shadings. Due to the above-mentioned problem of the undistinguishability of the laser lines, however, this is impossible in conventional methods.

In general, in the light-slit method, the projected laser lines are merely observed, that is, the method is based on diffusely scattering the laser light at the location of incidence on the object so that the camera may observe the line of the laser on the object without interferences. In the conventional light-slit method, there may however be additional problems when the surfaces of objects to be measured are partly reflecting so that reflections are created, which in the most unfavorable case are reflected into the optics of the camera, thereby corrupting the camera's image. In such a case, in a portion of the camera image in which only the light line should be seen, additional light patches occur, rendering the evaluation difficult if not impossible. If, for example, diffusely scattering car tires on reflecting aluminum rims are measured, this problem may occur when the portion of the light line incident on the aluminum is reflected in the camera range. In this case, the conventional light-slit method is not able to capture the tire.

SUMMARY

According to an embodiment, a light-slit measuring apparatus for the 3-dimensional measurement of the shape of an object may have: a first and a second light projector for producing a first and a second measurement light projection on a surface of the object; at least one camera for producing a light-slit recording of a surface of the object; and a support apparatus enabling unambiguous identification of the first or the second measurement light projection in the light-slit recording; and a camera support apparatus for enabling, by means of optics, producing a light-slit recording from different perspectives by means of the camera.

According to another embodiment, a method of the 3-dimensional measurement of the shape of an object may have the steps of: producing a first and a second measurement light projection on a surface of the object; producing a light-slit recording of a surface of the object, wherein, in producing the light-slit recording, different perspectives of the object are imaged; and unambiguous identifying of the first or the second measurement light projection in the light-slit recording.

An embodiment may have: a computer program with a program code for performing a method of the 3-dimensional measurement of the shape of an object, the method having the steps of: producing a first and a second measurement light projection on a surface of the object; producing a light-slit recording of a surface of the object, wherein, in producing the light-slit recording, different perspectives of the object are imaged; and unambiguous identifying of the first or the second measurement light projection in the light-slit recording, when the program runs on a computer.

The present invention is based on the finding that improved measurement in particular of three-dimensional bodies is possible when there is provided means by which first and second measurement light projections on a surface of an object to be measured may be unambiguously identified as originating from a first or second light projector. For this purpose, there is inventively provided a support apparatus advantageously operating a camera and/or the measurement light projectors such that, in each light-slit recording of the camera, either only the first or only the second measurement light projection is visible to the camera.

In an embodiment of the present invention, the problem of identifying overlapping light lines is solved in that light lines are projected onto the object not in a simultaneous but in a sequential manner, that is successively in different phases of the measurement procedure. With the help of the support apparatus, the camera intended for detecting the respective light line is also clocked such that same is not sensitive unless only one light line to be recorded is active in each case.

That is, a complete recording of an object is broken down into several phases, in which only those light lines and cameras are active that do not exhibit any mutually overlapping regions. This serves to efficiently avoid a camera seeing two different light lines per recording. This makes the use of standard special light-slit cameras possible, which autonomously determine the position of a light line at a high measuring frequency so as to efficiently and cost-effectively use several parallel light projections for the evaluation, wherein at the same time the high evaluation speed of the light-slit cameras is maintained.

This serves to advantageously avoid, among other things, shadings, for example by having the camera detect the object from above in a rectangular manner, and having arranged in a manner symmetrical relative to the vertical two lasers for the projection of a light line, which are sequentially switched on and off. The measured values of the two (or several, if necessitated) recording phases are combined so that there is a valid measured value for each measurement section (or measurement point, that is, at each location of the feed in the scan direction). By scanning the object, the measurement points are finally combined to form a complete 3D image of the surface with hardly any shadings occurring. Although the effective measurement rate is reduced as a result of the sequential switching in of light lines and cameras, special light-slit sensors permit such high measurement rates that this reduction of the effective measurement rate has no negative effect on inventive light-slit measuring apparatus and measurement speed and/or measurement precision thereof.

Arranging two lasers in a manner symmetrical to the line of vision of a camera results in slight additional expenses as a second laser has to be installed. However, with low laser performance, the additional expenditure is substantially less than when using a second camera as is often practiced. As a whole, what results is the major benefit that in using the inventive concept, the occurrence of shadings may be prevented with little additional expenses. In addition, a complete surface of an object may be measured by means of several light streaks that are not exactly aligned with one another.

In a further embodiment of the present invention, the unambiguous identification of a first and a second measurement light projection is enabled by the fact that laser light of different wavelengths is used for the first and second measurement light projections. Here, the respectively desired camera is equipped with a corresponding optical filter for detecting the light line so that light lines not to be detected are sufficiently suppressed. In addition to that, a support apparatus is capable of changing a light filter of an individual camera in a time-variable manner so that several laser beams may be unambiguously differentiated using only one camera. In addition, should two different wavelengths not be sufficient for avoiding overlapping, basically any number of further wavelengths may be added.

The use of differently colored lasers has the major benefit that all light lines may be detected in a parallel manner. Thereby, the maximum measuring frequency of the measuring camera may be exploited. The effective measuring frequency in sequential methods may basically be increased by shortening the exposure times, which, however, necessitates increasing the laser power applied so as to still be able to reproduce the measurement line per individual recording. As high-power lasers are much more expensive than lowerpower lasers, the use of differently colored laser radiation brings about an additional significant cost advantage.

BRIEF DESCRIPTION OF THE DRAWINGS

Embodiments of the present invention will be detailed subsequently referring to the appended drawings, in which:

FIG. 3b shows a clock cycle diagram for operating the light-slit measuring apparatus of FIG. 3a;

DETAILED DESCRIPTION

Figure 1:
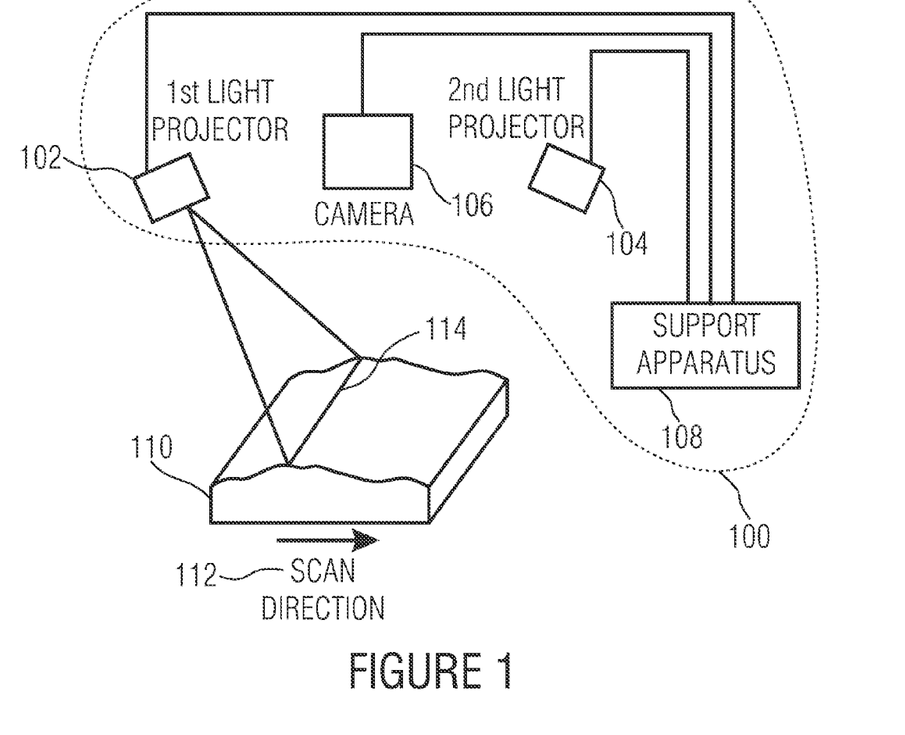
FIG. 1 shows a schematic diagram of an inventive light-slit measuring apparatus.

FIG. 1 shows an embodiment of an inventive light-slit measuring apparatus 100 comprising a first light projector 102, a second light projector 104, a camera 106 and a support apparatus 108.

The light-slit measuring apparatus 100 serves for the 3-dimensional measurement of the shape of an object 110, which is passed under the light-slit measuring apparatus 100 in the scan direction 112.

Figure 2:
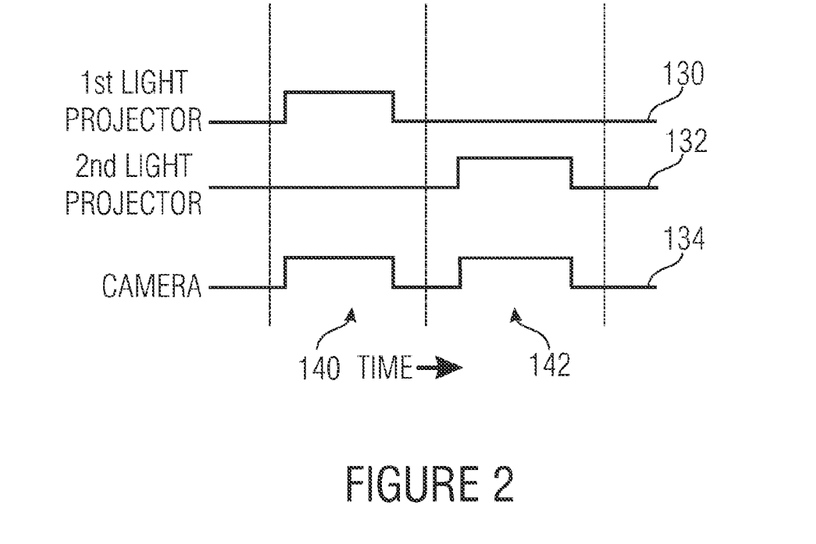
FIG. 2 shows a clock cycle diagram for operating the light-slit measuring apparatus of FIG. 1.

In the embodiment of the present invention shown in FIG. 1, the distinguishability of two measurement light beams is ensured by the support apparatus 108, which is connected to the first light projector 102, the second light projector 104 and the camera 106. The support apparatus 108 operates the camera 106 and the light projectors 102 and 104 in a clocked manner such that, for successive images of the camera 106, either a light projection 114 is produced on a surface of the object 110 by the first light projector 102, as can be seen in FIG. 1, or by the second light projector 104. One example of a clocking scheme, by means of which the switching by the support apparatus 108 is effected, is represented in FIG. 2. The mode of operation of the light-slit measuring apparatus 100 is explained in the following with respect to FIG. 2.

On a common x axis, FIG. 2 shows the time in arbitrary units, while the switching states, that is the on-state and the off-state are shown in a clock cycle representation 130 for the first light projector, in a clock cycle representation 132 for the second light projector 104 and in a clock cycle representation 134 for the camera 106.

The support apparatus 108 controls the light projectors 102 and 104 and/or the camera 106 in a first phase 140 such that the first light projector 102 produces the projection of the light beam on the object 110, wherein the camera 106 is active and records the projected light beam. In a succeeding second phase 142, however, the first light projector 102 is switched inactive, while the second light projector 104 produces the measurement light projection on the object 110, which is recorded by means of the camera 106 in the second phase 142.

As can be seen from FIGS. 1 and 2, according to the invention, it is therefore possible to unambiguously allocate the sources of the measurement light projection to individual camera recordings.

What is particularly advantageous in the embodiment shown in FIG. 1 is that virtually no shading effects are caused in the assembly of the components shown in FIG. 1.

Figure 3A:
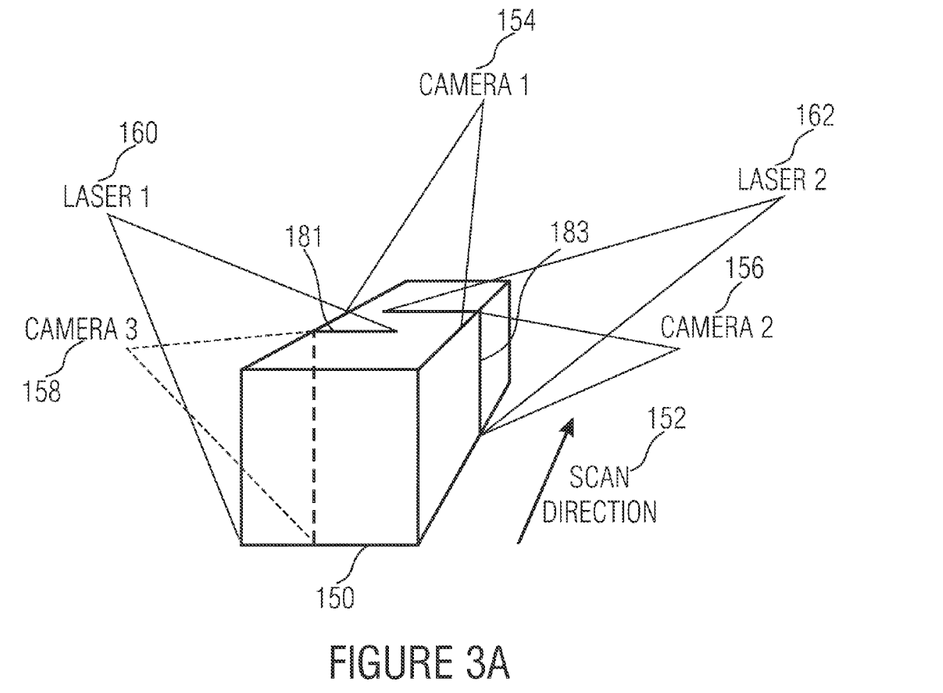
FIG. 3a shows a light-slit measuring apparatus for the complete measurement of a 3-dimensional surface.

FIG. 3a shows a further embodiment of the present invention, wherein a cuboid is completely 3-dimensionally detected, complete detection meaning that a bearing surface of the cuboid is assumed planar and therefore known so that only three remaining sides of the cuboid are to be determined by the inventive light-slit measuring apparatus.

FIG. 3a shows a cuboid 150 to be measured, which is moved in a scan direction 152, wherein for complete measurement of the cuboid 150, a first camera 154, a second camera 156, a third camera 158 as well as a first laser 160 and a second laser 162 are used. The clock signals for driving the cameras and lasers are plotted in arbitrary units versus time in FIG. 3b, wherein a signal 170 controls the first laser 160, a signal 172 controls the second laser 162, a signal 174 controls the first camera 154, a signal 176 controls the second camera 156 and a signal 178 controls the third camera 158. In the following, the mode of operation of the inventive light-slit measuring apparatus of FIG. 3a is to be explained with respect to FIGS. 3a and 3b.

Figure 3B:
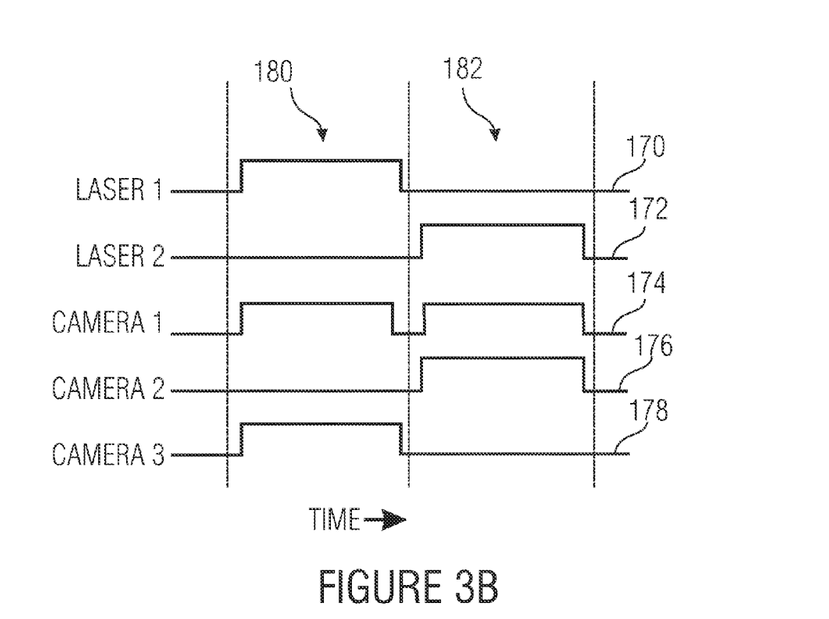

The first laser 160 illuminates the left-hand side of the cuboid 150 in a first measurement phase 180, the second laser 162 being switched off. The position of the associated light line is detected by the first camera 154 and the third camera 158 in the measurement phase 180. As a result of the oblique projection of the light line, the entire left-hand side of the cuboid 150 and a portion of the upper surface of the cuboid 150 is illuminated. Therefore, in the measurement phase 180, 3-dimensional positions of the left-hand side surface are detected by the third camera 158, and 3-dimensional positions of portions of the upper surface of the cuboid 150 are detected by the first camera 154.

By moving the cuboid 150 in the scan direction 152, 3D data are successively ascertained for the above-described portions of the cuboid. In a second measurement phase 182, the first laser 160 is switched off and the second laser 162 illuminates the right-hand surface and a portion of the upper surface of the cuboid 150. The detection of the measurement data is now effected by means of the first camera 154 and the second camera 156. According to the invention, the light lines of the first laser 160 and the second laser 162 need not be made to lie on top of each other as the cuboid 150 is completely detected during the scan procedure, wherein the measurement data may be correctly assembled on a computer in post-processing so as to produce the entire 3-dimensional image of the cuboid 150. The inventive clocked operation, which is controlled by a support apparatus, therefore serves to prevent simultaneous operation the first laser 160 and the second laser 162.

Figure 3C:
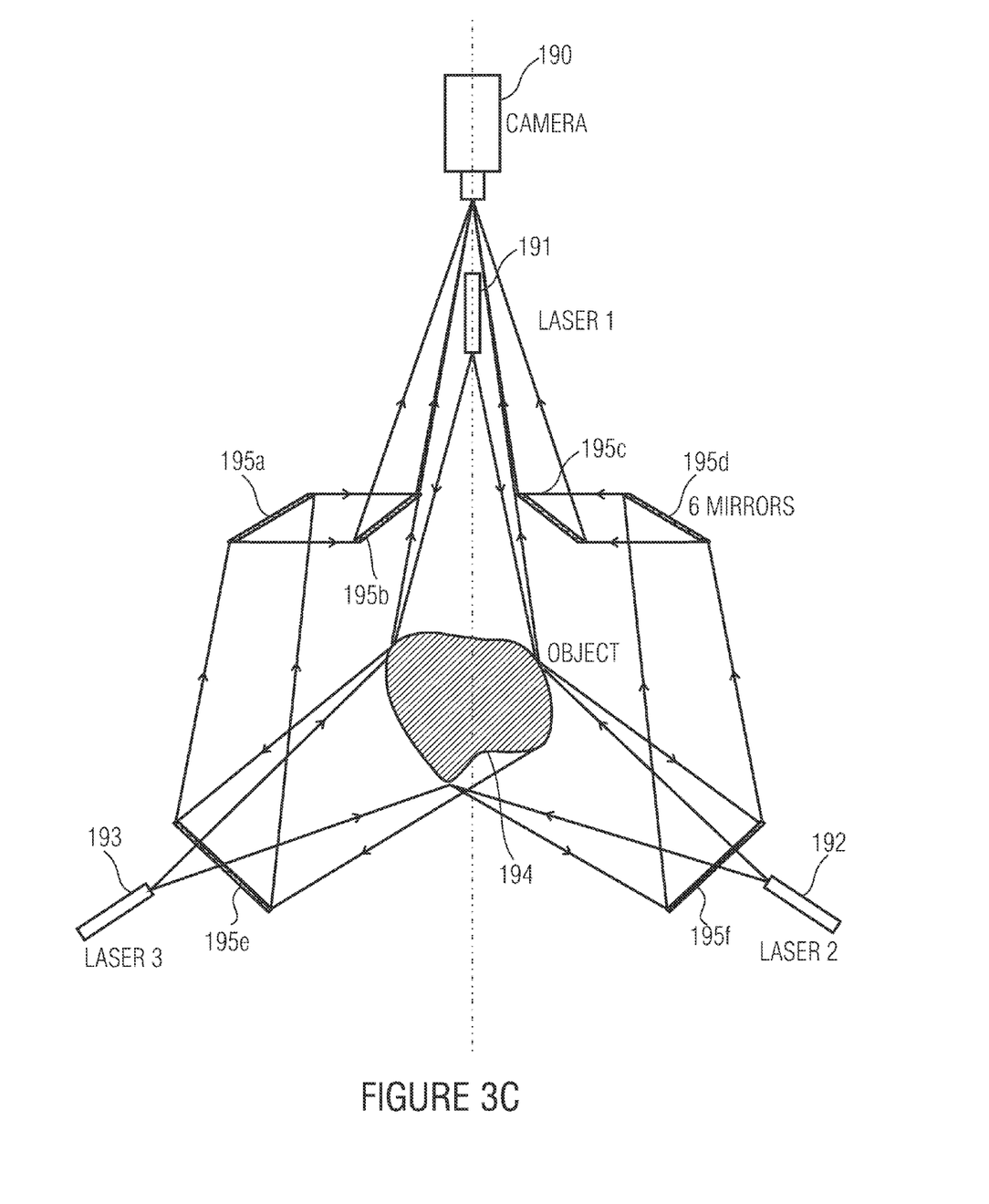
FIG. 3c shows a further embodiment of a light-slit measuring apparatus for the complete measurement of a 3-dimensional surface.

FIG. 3c shows a further embodiment of the inventive light-slit measuring apparatus.

What is shown is a camera 190, a first laser 191, a second laser 192 and a third laser 193, which illuminate an object 194 to be measured from all sides so that the complete enclosed outline of the object 194 is detected by measurement light streaks or measurement light projections on the surface thereof.

Furthermore, six mirrors 195a to 195f are shown, which combine to form optics enabling recording the object from different perspectives using only one camera 190. For this purpose, in the case shown in FIG. 3c, a portion of the solid angle recorded by the camera is detected by means of mirrors 195b and 195c, and the optical train is diverted, via mirrors 195a and 195e and mirrors 195d and 195f, respectively, such that the object 194 is simultaneously illuminated from different perspectives by a sensor installed in the camera 190.

The six mirrors combine to form optics of a camera support apparatus enabling production of a light-slit recording from different perspectives by means of only one camera 190.

For an inventive support apparatus, different types of optics come into question. On the one hand there is the option of designing optics such that the different perspectives of the object 194 are simultaneously imaged on different regions of the sensor installed in the camera 190. When the individual regions are known, it is even possible to simultaneously operate the lasers 191, 192 and 193, given that the optics guarantee that only geometrically separable sensor regions are illuminated at a time by the individual lasers.

In an alternative embodiment, the assembly shown in FIG. 3c may be operated in a clocked manner, in a similar manner as discussed in the preceding paragraphs with respect to FIG. 3b. Here, in particular, the optics of the support apparatus may be configured such that the entire sensor surface is available for the recording from each single prospective, thus ensuring maximum spatial resolution. This may be achieved by means of mirrors folding into the optical train, for example.

Semitransparent mirrors may also be used, for example, so that several measurement light streaks may be simultaneously observed by means of a camera 190.

For differentiating the individual measurement light streaks, in principle, the methods already discussed in the preceding examples come into question. For example, rotating color fields may additionally be installed in front of the camera 190, in case lasers 191 to 193 of different wavelengths are used.

The embodiment of the present invention shown in FIG. 3c provides the major benefit that the entire object may be measured in three dimensions by means of only one camera 190. This maybe achieved, for example, by using comparatively cost-effective passive optical devices such as the mirrors 195a to 195f shown in FIG. 3c, for example.

The camera support apparatus shown in FIG. 3c, which employs suitable optics, may fundamentally enable an arbitrary amount of perspective recordings by means of one single camera only. When optics are used that are capable of directing, exclusively in each case, different optical trains to the camera 190, this being possible by means of tilted mirrors, for example, advantageously, not even the release ability is impaired.

Figure 4:
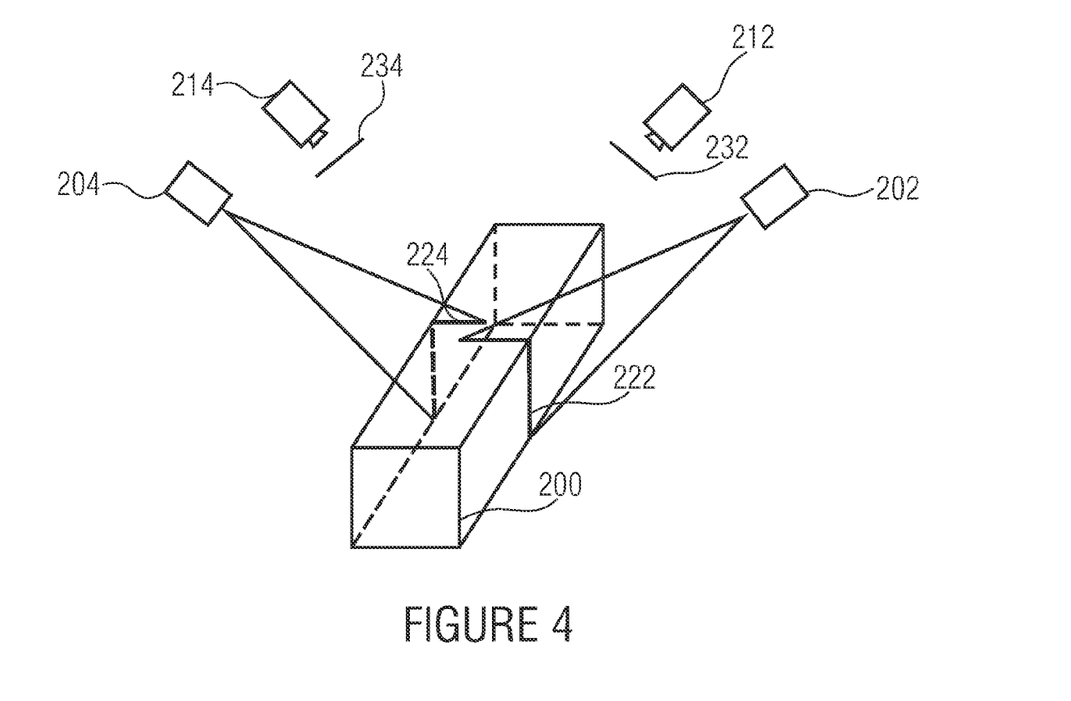
FIG. 4 shows a light-slit method with lasers of different wavelengths.

FIG. 4 shows a further embodiment of the present invention, wherein the surface of an object is measured by means of two light beams and two cameras.

FIG. 4 shows an object 200 to be measured, a first measurement light projector 202, a second measurement light projector 204, a first camera 212 and a second camera 214. On the right-hand side, and on a portion of the surface of the object 200, a first measurement light streak 222 in a first color, in which the light includes a first wavelength range, is projected by the first measurement light projector 202. On the left-hand side and a second portion of the surface of the object 200, a second measurement light streak 224 is produced by the second measurement light projector 204, the second measurement light streak 224 having another color than the first measurement light streak 222. In front of the first camera 212, there is installed a first wavelength filter 232, the filter characteristic of which is selected such that the first camera 212 is capable of observing the first measurement light streak 222 of the first color only. Correspondingly, there is a second filter 234 in front of the second camera 214, which exhibits a filter characteristic letting only light in the wavelength range of the second measurement light streak 224 pass so that the second camera 214 observes the second measurement light streak 224 only.

This serves to achieve that the measurement may be conducted in a continuous manner, such that none of the measurement light projectors need to temporarily be shut down or switched off, which would result in a reduction of the effective measurement rate of a camera by a factor 2. Therefore, according to the invention, the high measurement rate of specialized light-slit cameras may be utilized to its full extent when the inventive concept is implemented as shown in FIG. 4.

In an alternative embodiment of the concept shown in FIG. 4, the measurement lines of different wavelengths are used with only one single camera being used for observation. In addition, there is then provided means arranging alternating color filters in front of the camera so that only one unambiguously allocatable measurement line may be observed on each recording. This may be achieved by means of a filter wheel, for example, which comprises different filter foils in individual segments of a circle, wherein, by rotating the filter wheel, individual filter foils may be brought in front of the camera lens in a precise time-controlled manner. This serves to avoid the additional expense of a second camera but reduces the effective measurement rate by the factor 2. In the case of preventing shading effects by the use of two lasers this is acceptable, however, as in this case, the effective measurement rate is reduced only when one of the laser beams is in fact shaded.

Although the inventive concept was described by means of the preceding examples in view of controlling and/or using two lasers, generally, more complex 3D surfaces will necessitate a larger number of lasers and cameras so as to be able to avoid shading effects and detect the entire surface. Accordingly, it may come to be essential to define more than two recording phases, in which several groups of lasers and cameras are active at different times to produce the measurement data of the surface. This is advantageously realizable by means of the inventive concept, in which the number of different measurement phases is basically not limited. In addition, an arbitrary number of differently colored lasers may of course be used to implement the inventive concept by means of an arbitrary amount of differently colored lasers and cameras with color filters.

The inventive use of several lasers may advantageously serve to also eliminate the problem of possibly occurring reflections, when camera images with reflection components may be discarded as same may in a second measurement phase be replaced by a redundant camera image. This is possible as, according to the invention, unambiguously allocating a measurement light streak to a laser is enabled.

To sum up, the present invention enables reconstructing, during exactly one scanning procedure on the basis of the light-slit method, a 3D detection of a body, given that its surface is sufficiently smooth.

While in the embodiments of the present invention described in the preceding sections, the inventive support apparatus enabling unambiguous identification of first or second measurement light projections in a light-slit recording was described with respect to two examples, that is the clocked operation of a light-slit measuring apparatus and the providing of wavelength filters for differentiating differently colored measurement light projections, any other embodiments are also possible. As an example, the support apparatus may be configured such that light is modulated (amplitude or phase modulated) for the generation of a measurement light projection so that unambiguous allocation of a measurement light projection to a projector may be effected by an evaluation apparatus on the basis of the modulation of the signal.

As a simple example of amplitude modulation, in particular, the intensity of the measurement light beam may also be altered so that the individual measurement light projections may be differentiated on the basis of the different intensities the camera perceives.

One further alternative for implementing the support apparatus allowing unambiguous identification of first or second measurement light projections is altering the geometrical shape of a measurement light projection. One possibility is varying the width of a light streak so that a widened measurement light streak may easily be differentiated from a normal one, for example. In addition, the geometrical shape of a streak may be arbitrarily used for coding the information on the origin of the streak. A streak interrupted at certain intervals may be conceivable, wherein the sequence of the interruptions of the light streak contains the code. In addition, a pattern of short light streaks arranged perpendicularly to the course of the actual measurement light streak may define a code sequence that may be drawn upon for the differentiation.

While in the embodiments of the present invention described, different phases of the exposure are passed through in alternating order, it is also possible to pass through a phase several times in a row, should this be needed. In particular, the controller may also dynamically change the order of the phases, should this be necessitated by e.g. erroneous evaluation.

Depending on the circumstances, the inventive method for the 3-dimensional measurement of the shape of an object may be implemented in hardware or in software. The implementation may be effected on a digital storage medium, in particular a floppy disc or CD with electronically readable control signals, which may cooperate with a programmable computer system such that the inventive method for the 3-dimensional measurement of the shape of an object is effected. In general, the invention therefore also consists in a computer program product with a program code for performing the inventive method stored on a machine readable carrier when the computer program product runs on a computer. In other words, the invention may therefore be realized as a computer program with a program code for performing the method when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A light-slit measuring apparatus for the 3-dimensional measurement of the shape of an object, comprising:
   a first and a second light projector for producing a first and a second measurement light projection on a surface of the object;
   at least one camera for producing a light-slit recording of a surface of the object; and
   a support apparatus enabling identification of the first or the second measurement light projection in the light-slit recording; and
   optics arranged to enable light-slit recording from different perspectives by the camera, wherein the optics comprise mirrors configured to divert light stemming from illumination of the object from different perspectives to the camera.

2. The light-slit measuring apparatus according to claim 1, wherein different image regions of the light-slit recording are allocated to different perspectives.

3. The light-slit measuring apparatus according to claim 1, wherein the support apparatus is configured to effect that, on each light-slit recording, either the first or the second measurement line projection are visible to the camera.

4. The light-slit measuring apparatus according to claim 1, wherein the support apparatus is configured to drive, in a clocked manner, the first and the second light projector as well as the camera such that, per light-slit recording, either the first or the second measurement light projection is visible on the surface of the object.

5. The light-slit measuring apparatus according to claim 1, wherein the first and the second light projector use different light wavelengths; and
   wherein the support apparatus comprises a wavelength filter for the camera comprising a first and a second wavelength range so that, in a light-slit recording in the first wavelength range, only the first measurement light projection, and, in a light-slit recording in the second wavelength range, only the second measurement light projection is visible in the light-slit recording.

6. The light-slit measuring apparatus according to claim 5, wherein the support apparatus comprises a filter matrix comprising a first filter-matrix element as a wavelength filter with the first wavelength range and a second filter-matrix element as a wavelength filter with the second wavelength range, which are arranged on a sensor element matrix of the camera such that a first sensor element is covered by the first filter matrix element and a second sensor element is covered by the second filter matrix element.

7. The light-slit measuring apparatus according to claim 1, wherein an optical axis of the camera is substantially perpendicular to the surface of the object.

8. The light-slit measuring apparatus according to claim 7, wherein a relative direction of movement of the object and of the optical axis of the camera is selected such that the optical axis of the camera, in a relative movement of object and camera, remains substantially perpendicular to the surface of the object in a manner parallel to the relative direction of movement.

9. The light-slit measuring apparatus according to claim 1 wherein the first and the second light projector are arranged symmetrically relative to the camera.

10. The light-slit measuring apparatus according to claim 9, wherein an axis defined by the position of the first and the second light projector is substantially parallel to a relative direction of movement between the object and an optical axis of the camera.

11. The light-slit measuring apparatus according to claim 1, wherein the camera comprises a sensor element matrix.

12. A method of the 3-dimensional measurement of the shape of an object, comprising:
   producing a first and a second measurement light projection on a surface of the object;
   producing a light-slit recording of a surface of the object, wherein, in producing the light-slit recording, different perspectives of the object are imaged using optics, wherein the optics comprise mirrors configured to divert light stemming from illumination of the object from different perspectives to the camera; and
   identifying of the first or the second measurement light projection in the light-slit recording.

13. The method according to claim 12, wherein the first measurement light projection is produced in a first wavelength range, and wherein the second measurement light projection is produced in a second wavelength range, wherein only the first wavelength range is visible on the light-slit recording, additionally comprising:

producing a second light-slit recording of the surface of the object, wherein only the second wavelength range is visible on the second light-slit recording.

14. The method according to claim 12, wherein a light-slit recording is produced by means of a sensor element matrix.

15. A non-transitory computer-readable medium storing a computer program, when run on a computer, the computer programs performs a method of the 3-dimensional measurement of a shape of an object, comprising:

producing a first and a second measurement light projection on a surface of the object;

producing a light-slit recording of a surface of the object, wherein, in producing the light-slit recording, different perspectives of the object are imaged using optics, wherein the optics comprise mirrors configured to divert light stemming from illumination of the object from different perspectives to the camera; and identifying of the first or the second measurement light projection in the light-slit recording.

* * * * *